United States Patent [19]
Gund et al.

[11] 3,716,536
[45] Feb. 13, 1973

[54] METHOD OF PREPARING BENZOGUANAMINES

[75] Inventors: Peter Herman Gund, Hightstown; Gerald Berkelhammer, Princeton, both of N.J.

[73] Assignee: American Cyanamid Company, Stamford, Conn.

[22] Filed: Sept. 17, 1971

[21] Appl. No.: 181,631

[52] U.S. Cl. ................................................260/249.9
[51] Int. Cl. ..............................................C07d 55/20
[58] Field of Search....................................260/249.9

[56] References Cited

UNITED STATES PATENTS

| | | | |
|---|---|---|---|
| 2,408,694 | 10/1946 | Simons et al. | 260/249.9 X |
| 2,517,824 | 8/1950 | Appelquest | 260/249.9 X |
| 2,541,005 | 2/1951 | Oldham et al. | 260/249.9 X |

*Primary Examiner*—John M. Ford
*Attorney*—Ernest Y. Miller

[57] ABSTRACT

A process for the preparation of benzo and substituted benzoguanamines, is described.

These compounds are useful as intermediates in the preparation of thermosetting resins, pharmaceuticals and the like.

7 Claims, No Drawings

METHOD OF PREPARING BENZOGUANAMINES

SUMMARY OF THE INVENTION

This invention involves the preparation of benzoguanamine and substituted benzoguanamines by the reaction of guanidine carbonate and a benzaldehyde in the presence of an inert organic solvent at an elevated temperature. The reaction is graphically illustrated below:

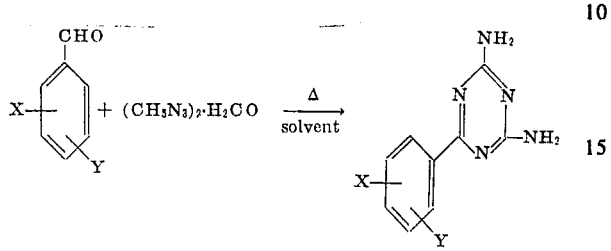

wherein X is hydrogen, halogen or methyl and Y is hydrogen, halogen or diloweralkylamino ($C_1$–$C_4$), with the proviso that when Y is diloweralkylamino then X is hydrogen. The substituent X and Y can each present any of the halogens including fluorine, chlorine, bromine, or iodine. The preferred halogens of the present invention are chlorine or bromine. Similarly, where the term diloweralkylamino is meant to include alkyl groups having one to four carbon atoms, methyl and ethyl are preferred.

The predominant literature procedure for benzoguanamine synthesis is the reaction of benzonitrile with dicyandiamide. Other procedures include the benzoylation of dicyandiamide followed by heating or treatment with cyanamide and the high temperature reaction of benzonitrile and cyanamide. These methods are all capable of preparing the above-identified products; however, they are not entirely satisfactory and an improved process for the manufacture of benzoguanamine and substituted benzoguanamines in good yield and purity, is most desirable.

The present process may be carried out in the absence of solvent or in the presence of a protic solvent, such as, the saturated lower alcohols having one to four carbon atoms and the alkoxyalcohols. The latter term, alkoxyalcohols, as hereinafter used, describes alcohols in which both the alkoxy and alkyl portions of the alcoholic solvents can have from one to four carbon atoms; methoxyethanol, 2-ethoxyethanol and 2-butoxyethanol are representative of alkoxyalcohols which can be used herein.

The reaction is generally carried out at a temperature between about 40°C. and 150°C., and preferably between about 70°C. and 120°C.

In practice, we have found that the molar ratio of the guanidine carbonate to the benzaldehyde should be between 1:1 and 2:1, and preferably approximately 1:1 with only a slight excess of the guanidine.

The compounds prepared by the process of this invention are known. They have been manufactured by a variety of processes and have a plethora of uses. For example, they have been used as intermediates in the manufacture of thermosetting resins, pesticides, pharmaceuticals and dyestuffs.

The process of this invention is convenient, utilizes readily available and relatively inexpensive starting materials, requires minimal manufacturing equipment and relatively mild reaction conditions.

SPECIFIC DISCLOSURE

Other advantages may become apparent from the examples set forth below which are provided simply by way of illustration and are not intended to limit the scope of the invention.

EXAMPLE 1

Preparation of Benzoguanamine

A mixture of 6.0 grams (0.033 mole) of guanidine carbonate and 35.4 ml. (0.33 mole) of benzaldehyde is heated at reflux under nitrogen for 45 minutes, then poured into 200 ml. of petroleum ether (boiling point 30°C. to 60°C.), and the solvent decanted. The yellow oily residue is extracted with 100 ml. of ether, and the decanted ethereal layer evaporated to a yellow oil. The oil is shaken with 50 ml. of ethanol-ether (1:1) to give 1.9 grams of benzoguanamine as a pale yellow powder, melting point 174°C. to 200°C.

Recrystallization from methanol-benzene gives material of melting point 218°C. to 223°C., giving an infrared spectrum characteristic of benzoguanamine.

EXAMPLE 2

Preparation of Benzoguanamine

A mixture of 3.5 ml. of benzaldehyde, 6.0 grams of guanidine carbonate in 50 ml. of ethanol is refluxed for 65 hours. Benzoguanamine and a 73 percent recovery of guanidine carbonate are obtained.

Replacing ethanol by methoxyethanol and refluxing 5 ½ hours and pouring into water gives benzoguanamine, melting point 213°C. to 216°C.

EXAMPLE 3

Preparation of p-Chlorobenzoguanamine

Guanidine carbonate (4 grams) and 3.5 grams of barium hydroxide are mixed in 30 ml. of water, filtered of barium carbonate precipitate, and the water removed under reduced pressure at 30°C. to 40°C.

The resulting semi-solid guanidine is taken up in 50 ml. of ethanol, filtered of additional barium carbonate, and refluxed with 14.5 grams of p-chlorobenzaldehyde for 27 hours. It is then acidified with 3N hydrochloric acid (to pH 3) and diluted with ether to afford 1.6 grams of p-chlorobenzoguanamine, melting point 245°C. to 250°C. Recrystallization from tetrahydrofuran-ether raises the melting point to 253°C. to 255°C.

Substitution for p-chlorobenzaldehyde in this procedure of equimolar amounts of p-tolualdehyde, m-bromobenzaldehyde, 3-chloro-4-methylbenzaldehyde, p-dimethylaminobenzaldehyde, 3,4-dichlorobenzaldehyde and 3-bromo-4-chlorobenzaldehyde affords, respectively, p-methylbenzoguanamine, m-bromobenzoguanamine, 3-chloro-4-methylbenzoguanamine, p-dimethylaminobenzoguanamine, 3,4-dichlorobenzoguanamine, and 3-bromo-4-chlorobenzoguanamine.

We claim:

1. A method for the preparation of a compound of the formula:

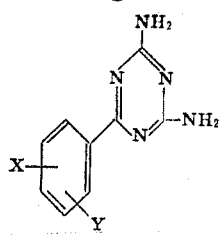

wherein X is hydrogen, halogen or methyl and Y is hydrogen, halogen or diloweralkylamino, with the proviso that when Y is diloweralkylamino then X is hydrogen, comprising reacting a compound of the formula:

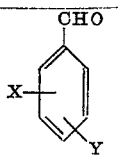

wherein X and Y are as described above, with guanidine carbonate at a temperature within the range of about 40°C. and 150°C.

2. A method according to claim 1, wherein the molar ratio of guanidine carbonate to the benzaldehyde is from 1:1 to 2:1.

3. A method according to claim 1, wherein the reaction is conducted in the absence of solvent.

4. A method according to claim 1, wherein the reaction is conducted in the presence of a protic solvent.

5. A method according to claim 1, wherein the molar ratio of guanidine carbonate to benzaldehyde is from 1:1 to 2:1 and the reaction is conducted in the presence of a protic solvent.

6. A method according to claim 1, wherein the reaction is carried out in protic solvent selected from the group consisting of saturated alcohols having one to four carbon atoms and loweralkoxyloweralcohols.

7. A method according to claim 1, wherein the reaction is carried out at a temperature between 70°C. and 120°C.

* * * * *